INVENTOR.
Cletus J. Collom.
BY
Harness, Dickey & Pierce.
ATTORNEYS.

Patented Aug. 23, 1949

2,480,000

UNITED STATES PATENT OFFICE 2,480,000

ELECTRIC CONTROL SYSTEM

Cletus J. Collom, Southfield Township, Oakland County, Mich., assignor to Weltronic Company, Detroit, Mich., a corporation of Michigan Application December 6, 1946, Serial No. 714,586

15 Claims. (Cl. 315—271)

This invention relates generally to electrical control systems and is especially adapted, among other uses, as a control for regulating the flow of welding energy.

Objects of this invention are: to provide a control system of the above-mentioned type, which is simple in arrangement, economical of manufacture, and which is efficient in its operation; to provide an improved timing mechanism for determining the portion of an electrical cycle during which current flows through the welding transformer; to provide a phase-shifting circuit for controlling an electronic tube which is normally operable to maintain the tube nonconductive, but, upon actuation thereof, renders the tube conductive during predetermined portions of an electrical wave; to provide such a phase-shifting system in which energization of a portion thereof is controlled by the conductivity of a pair of reversedly arranged electronic valves; to provide a phase-shifting circuit for operating an electronic valve which will maintain a nonconducting bias on the valve throughout a greater time period than that in which the anode of this valve is positive with respect to the cathode thereof; to provide a phase-shift circuit which will control an electronic valve irrespective of slight transient changes in phase thereof; and to provide a simple, inexpensive means for controlling the flow of welding current through a welding transformer. Further objects will be apparent from the specification and the appended claims.

Preferred but illustrative embodiments of the invention are shown in the accompanying drawing, in which drawing.

Figure 1:
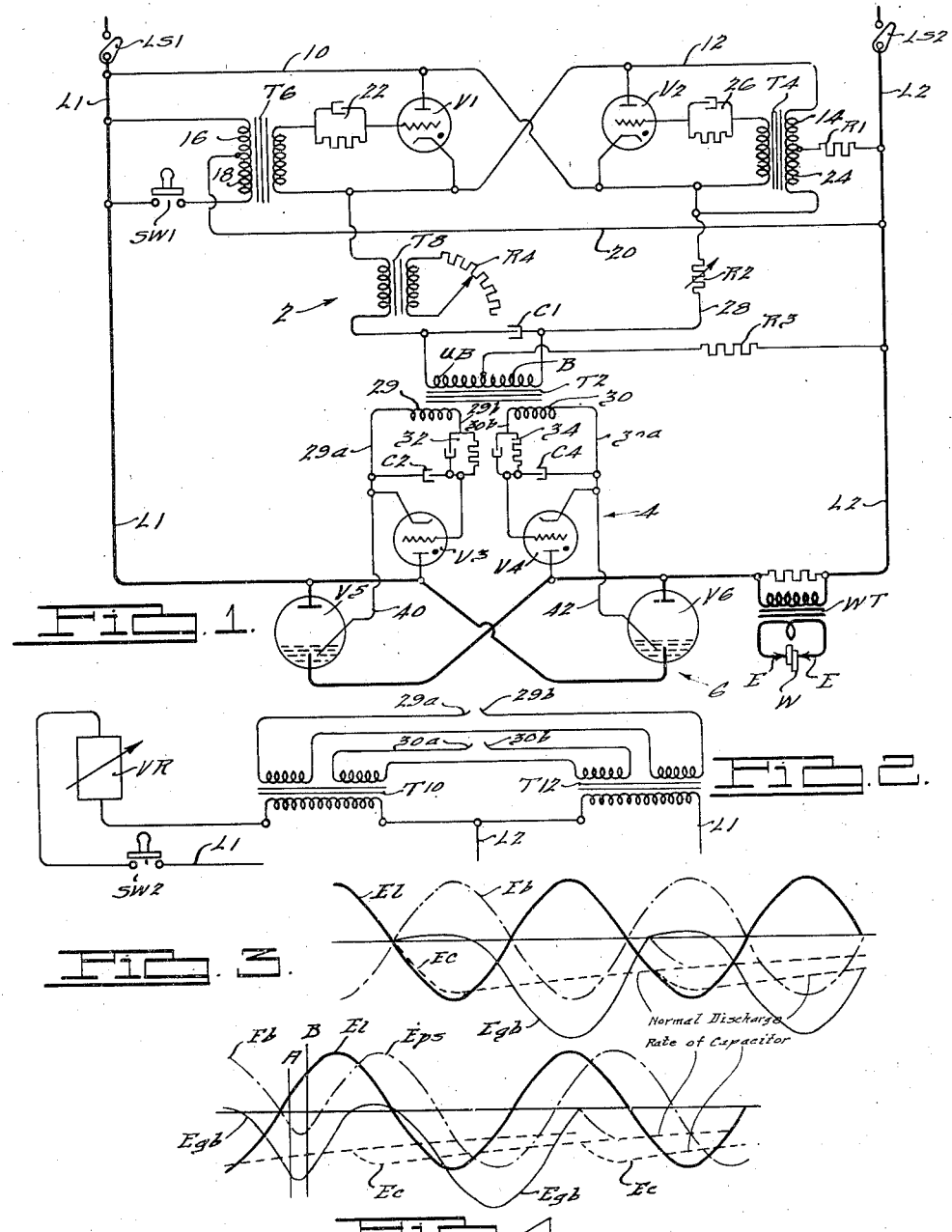
Fig. 1 is a diagrammatic view of an electrical control system for a welding transformer embodying the invention.

It will be appreciated, from a complete understanding of the present invention, that, in a generic sense, the improvements thereof may be embodied in electrical control systems intended for various specific purposes and that such control systems may be variously arranged. In its present preferred form the invention is utilized to control an electric welding circuit of the impulse type, and, by way of illustration but not of limitation, the invention is so disclosed herein.

Referring to the drawings by characters of reference, the system comprises generally a phase-shifting network 2, a firing network 4, and a power-controlling network 6. When the valves V1 and V2 of the network 2 are nonconductive, the transformer T2 thereof is operable to impress upon the grids of the valves V3 and V4 of the network 4 a potential which maintains the grids thereof negative with respect to the cathodes thereof at all times when the anodes thereof are positive with respect to the cathodes thereof. The power-controlling valves V5 and V6 are thereby maintained de-energized to prevent flow of welding current through the welding transformer WT.

Referring more specifically to the initiating network 2, the network comprises a pair of back-to-back or reversedly connected valves V1 and V2 which preferably are of the gas-filled type, so that, when they are once rendered conductive, they will remain conductive as long as the anode thereof is positive with respect to the cathode thereof. The anode of the valve V1 and the cathode of the valve V2 are connected together and to supply line L1 by a conductor 10. Likewise, the anode of the valve V2 and the cathode of the valve V1 are connected together by a conductor 12 and to the supply line L2 through winding portion 14 of the primary winding of a grid bias controlling transformer T4 and through a resistor R1. A grid bias controlling transformer T6 has a center tapped primary coil dividing this coil into a first winding portion 16 and a second winding portion 18. The common terminal of the portions 16 and 18 is connected by means of conductor 20 to the supply line L2. The free terminal of the winding portion 16 is connected directly to the line L1, and the free terminal of the winding portion 18 is connected through switch SW1 to the line L1. One terminal of the secondary winding of the transformer T6 is connected to the conductor 12 and the other terminal is connected through a network 22 to the grid of the valve V1 whereby the transformer T6 is operable to control the grid bias of the valve V1.

Similarly, the transformer T4 has the primary winding portion 14 and a second primary winding portion 24 with a common terminal which is connected through the resistor R1 to the line L2. The free terminal of the winding portion 24 is connected to the conductor 10 so that the portion 24 is connected between the lines L1 and L2. The secondary winding of the transformer T4 is connected through a network 26 to the grid of the valve V2 and to the cathode of this valve whereby the transformer T4 is operable to control the grid bias of the valve V2.

The conductor 10 is connected by means of a conductor 28 and variable resistor R2 to one end terminal of a center tapped primary winding of the transformer T2; the center tap connection of this primary winding being connected through a resistor R3 to the line L2. The other end terminal of the primary of the transformer T2 is connected through the primary winding of a transformer T8 to the conductor 12. A condenser C1 shunts the end terminals of the primary winding of the transformer T2 for a purpose to be hereinafter described. In order that the reactance of the transformer T8 may be varied, the secondary winding thereof is connected through a variable resistor R4 whereby the value of the resistor R4 is operable to control the impedance of the transformer T8.

The network 4 comprises the valves V3 and V4 controlled by the transformer T2 having a pair of secondary windings 29 and 30. One terminal of each of these windings 29 and 30 is connected by lead wires 29a and 30a respectively to cathodes of the valves V3 and V4. The other ends of these windings 29 and 30 are respectively connected by lead wires 29b and 30b through networks 32 and 34 to the grids of the valves V3 and V4 respectively. Capacitors C2 and C4 are connected in shunt relationship between the grids and cathodes of the valves V3 and V4 respectively and act to eliminate or greatly reduce any transient current flowing in the respective grid circuits of the valves V3 and V4. The anodes of the valves V3 and V4 are respectively connected to the lines L1 and L2 while the cathodes of the valves V3 and V4 are connected to the igniters of the power valves V5 and V6 of the network 6.

The power-controlling network 6 comprises generally a pair of back-to-back, reversedly arranged power-controlling valves V5 and V6 which, as shown, are of the mercury-pool type ignited or rendered conductive upon the application to the cathode of a critical potential by its igniter. The anode of the valve V5 is connected directly to the line L1 and to the cathode of the valve V6. The anode of the valve V6 is connected through the primary winding of the welding transformer WT to the line L2 and also to the cathode of the valve V5.

It is thought that the remaining details of the system may best be understood with reference to a description of the operation thereof. Assuming that it is desired to condition the system for operation, the usual disconnect line switches LS1 and LS2 may be closed, thereby connecting the line conductors L1 and L2 to a source of supply which may be a conventional sixty-cycle alternating-current system. Energization of the lines L1 and L2 energizes the winding portion 16 of the transformer T6 and portion 24 of the transformer T4. Energization of the winding portion 16 causes the secondary of the transformer T6 to impress a voltage between the cathode and grid of the valve V1 which is substantially one hundred eighty degrees out of phase with the voltage between the anode and cathode of the valve V1. Likewise, energization of the primary winding portion 24 of the transformer T4 impresses a voltage between the grid and cathode of the valve V2 which is substantially one hundred eight degrees out of phase with the voltage between the anode and cathode thereof. The valves V1 and V2 are thereby maintained in a nonconductive condition.

At the same time the lines L1 and L2 were energized, the right-hand primary winding portion B was energized by a circuit extending from line L1 through conductor 10, variable resistor R2, conductor 28, winding portion B, and resistor R3 to the line L2. A voltage is therefore impressed between the grid and cathode of the valves V3 and V4 which maintains the grids thereof negative at all times that the anodes thereof are positive with respect to the cathodes thereof. Since the valves V3 and V4 are maintained in a nonconducting or blocked condition, the critical potential will not be applied to the igniters of the valves V5 and V6, and they will likewise be maintained nonconducting and no current will flow through the welding transformer WT. When, however, the switch SW1 is closed, current will flow from the line L1 through the winding portion 18 and conductor 20 to the line L2. This flow of current through the winding portion 18 bucks out the flux in the core of the transformer T6 due to current flow through the winding portion 16, thereby de-energizing the secondary winding of the transformer T6 and allowing the valve V1 to conduct. Upon conduction of the valve V1, current flows from the line L1 through conductor 10, valve V1, conductor 12, primary winding of the transformer T8, and the left-hand half winding portion UB of the primary winding of the transformer T2 and through the resistor R3 to the line L2. Current also flows through the valve V1 and conductor 12 through the winding portion 14 and resistor R1 to the line L2. This flow of current to the winding portion 14 bucks out the effect of the flow of current to the winding portion 24, thereby de-energizing the secondary winding of the transformer T4 so that during the subsequent half cycle to the half cycle in which the valve V1 is rendered conductive, the valve V2 will likewise conduct, causing current to flow through the before-mentioned circuit but in a reverse direction.

This current through the valves V1 and V2 flows through the variable reactor or transformer T8, through the winding portion UB of the transformer T2 so that the flux produced in the core of the transformer T2 by the winding UB combines with that produced in the core by the winding B so that the secondary winding of the transformer T2 applies a phase-shifted voltage to the grid valves V3 and V4 which renders them conductive during a predetermined desired portion of the voltage wave between the lines L1 and L2. The amount of phase shift, and consequently the exact portion of the voltage wave during which the valves V3 and V4 are conductive, depends upon the setting of the variable resistor R4.

The line L1 will of course be positive with respect to the line L2 whenever the valve V3 conducts and, at the instant that the valve V3 conducts, the critical potential will be supplied between the cathode and igniter of the valve V5, rendering the valve V5 conductive for current flow from the line L1 through the valve V5 and the welding transformer WT to the line L2. Welding current then flows between the electrodes E and through the work W associated with the welding transformer WT. During the subsequent half cycle of voltage between the lines L1 and L2, when the line L2 is positive with respect to the line L1, current will flow through the valve V4 to place the critical potential between the cathode and igniter of the valve V6, rendering the valve V6 conductive for current flow from the line L2 through the welding transformer WT and the valve V6 to the line L1. The valves V5 and V6 are therefore alternately rendered conductive at a predetermined point on each voltage wave as long as the switch SW1 remains closed.

When the switch SW1 is opened, however, the valve V1 is rendered nonconductive and remains nonconductive throughout subsequent cycles of the voltage wave. After the end of the half cycle subsequent to that during which valve V1 conducts, the valve V2 will of course be rendered nonconductive and remain in that condition during all subsequent half cycles to the half cycles in which the valve V1 is nonconductive. The rendering of the valves V1 and V2 nonconductive de-energizes the winding portion UB of the transformer T2 so that the voltage impressed between the grid and cathode of the valves V3 and V4 is again returned to the blocking voltage which is substantially one hundred eighty degrees out of phase with respect to the voltage between the lines L1 and L2.

Referring more specifically to the specific operation of the phase-shifting circuit portion of the network 2, Fig. 5A shows the relationship of the blocking voltage to the applied voltage between the lines L1 and L2, El designating the voltage wave of the applied voltage between the lines L1 and L2 and Eb representing the wave of the blocking voltage appearing across the secondary windings of the transformer T2 with the winding UB de-energized. It will be noted that, in this circuit, variable resistor R2 and resistor R3 are arranged in series circuit with the winding portion B of the transformer T2, thereby reducing the voltage across the winding portion B and regulating the value of the blocking voltage and, to some extent, its phase relationship with the voltage between the lines L1 and L2 to provide a blocking voltage which is just less than one hundred eighty electrical degrees behind the line voltage El.

When the valves V1 and V2 are conducting, the winding portion UB is energized. The voltage due to portion UB is represented in Fig. 5A by the reference character Eub. The value of the resistor R4 is so adjusted that the voltage wave Eub lags the voltage wave El by approximately twenty-two degrees. With the adjustment of the resistor R4, the magnitude of the voltage Eub is approximately twice that of the voltage Eb, and the actual bias voltage of the secondary winding of the transformer T6 will be the vector sum of the two voltages Eub and Eb which is represented by the dash line Eo in Fig. 5A. Since the windings UB and B are both on the same transformer core, no actual voltages Eub and Eb will be produced simultaneously. The voltage Eo represents the output voltage due to the resultant flux in the core of the transformer T2. The separate voltages Eub and Eb may of course be obtained by energizing either of the windings UB or B separately. Since it is easier to visualize the phase-shifting effect when voltages rather than flux are shown, the description will proceed as though the two voltages Eub and Eb were actually produced and mixed rather than describing the resultant flux which actually produces the resultant voltage Eo.

It will be noted that the resultant grid biasing voltage Eo lags the line voltage El by approximately forty-five electrical degrees. If this voltage were applied directly to the valves V3 and V4 which fire at substantially zero grid-bias potential, the valves V3 and V4 would fire substantially forty-five degrees behind the line voltage and consequently the valves V5 and V6 will likewise fire substantially forty-five degrees behind the line voltage El.

In Fig. 5B there is shown a similar relationship, but, however, the value of the resistor R4 has been increased, thereby increasing the value of the reactance of the transformer T6 which will both change the magnitude of the voltage Eub and its phase relationship with the line voltage El substantially as shown. The value of voltage Eub has been decreased to substantially the value of the voltage Eb and the voltage wave Eub lags the voltage El by approximately sixty-seven degrees. It will be noted, however, that the voltage wave Eo lags the voltage wave El by approximately one hundred thirty-five electrical degrees. The firing of the valves V3, V4, V5 and V6 will therefore occur at substantially one hundred thirty-five electrical degrees behind the voltage wave El and the welding energy supplied to the welding electrodes E by the welding transformer WT will be greatly reduced.

Again referring more specifically to some of the details of the phase-shifting circuit of the network 2, it will be noted that when the valves V1 and V2 are not conducting, the only current flowing through the resistor R3 is that flowing through the winding B. Therefore, the voltage drop thereacross is that due to the current in winding B, and the magnitude of the voltage wave Eb will be of a first value. The current which flows through the winding UB also flows through the resistor R3, thereby increasing the voltage drop thereacross and decreasing the value of the voltage across the winding portion B so that, when valves V1 and V2 conduct, the voltage Eb is reduced to substantially the value as shown by the curve Eb in Fig. 5.

It will be noted that the resistor R2 is shown as being of the variable resistance type, and adjustment thereof may be used to further determine the amount of phase shift produced by the phase-shift circuit of the network 2. As the value of the blocking voltage Eb is decreased due to an increase in value of resistor R2, the phase relationship and incidentally the magnitude of the resultant voltage Eo will be changed so that the resultant voltage Eo will decrease in the number of electrical degrees of lag from the voltage wave Eub and consequently the voltage wave El. As the value of the resistor R2 is decreased, the magnitude of the voltage wave Eb is increased, thereby causing a greater lag of the voltage wave Eo with respect to the voltage wave Eb and consequently of the wave Eo with respect to the voltage wave El, so that, with the same adjustment of the resistor R4, the valves V3—V6 will fire at a later time with respect to the voltage wave El. Similarly, as the value of the resistor R2 is increased, the value of the wave Eb will decrease, thereby moving the resultant grid bias wave Eo to a lesser lagging angle with respect to the voltage wave Eub and therefore the voltage wave El.

It will be obvious to those skilled in the art that the current wave through the valves V1 and V2 will not be sinusoidal but will consist of separated positive and negative pulses or loops of current which will start and end abruptly due to the fact that a predetermined voltage must be applied between the anode and cathode of the valves V1 and V2 before current flows and that it takes a second predetermined value of voltage between the anode and cathode of the valves to maintain current flow therethrough. It will be obvious that with current waves of this description, there will be transients caused by the abrupt current change. In order to prevent these transients as far as possible and to maintain substantially sinusoidal current flow through the valves V1 and V2, the condenser C1 has been applied between the terminals of the primary winding of the transformer T2 and the condensers C2 and C4 have been applied across the grid and cathode of the valves V3 and V4 respectively. When the values of these condensers are correctly proportioned with respect to the electrical characteristics of the circuit as may readily be done by those skilled in the art, the current wave flowing through the winding UB will approach sinusoidal form. It is further necessary, in order that a degree of stability be obtained in the phase shift produced by the phase-shifting circuit of the network 2, that this current flow through the winding portion be substantially sinusoidal in order that the potential drop across the resistor R3 may be maintained at the normal desired value, it being understood from the description presented hereinbefore that if the value of the resistor R3 varies greatly, the phase-shifting characteristics of the circuit will also vary, and it will be impossible to obtain any degree of consistency in the firing of the valves V5 and V6 which is necessary to maintain the power supplied to the welding electrodes E at a fixed value.

It will be noted that networks 32 and 34 are placed in the circuit from the transformer T2 to the grids of the valves V3 and V4 respectively. The functioning of these networks, as shown in the drawings (Figs. 3 and 4), is to provide a grid-bias voltage which leads the line voltage as the anode of the respective valve becomes positive and lags the line voltage as the anode of the respective valve becomes negative, thereby completely blocking the valve even if transients should occur in the circuits for any reason whatsoever. In explaining the operation of these networks 32 and 34, the operation of the network 32 will be described in detail, the operation of the network 34 being similar and differing only in that it operates with respect to the valve V4 when the line L2 is positive with respect to the line L1.

Figures 2, 3, 4, 5:
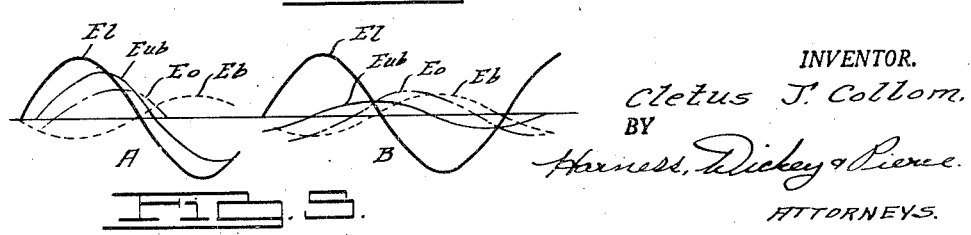
Fig. 2 shows a modification of a portion of the control system of Fig. 1.
Fig. 3 is a schematic diagram showing the inter-relationships of the various voltages in the system when the welding transformer is maintained de-energized.
Fig. 4 is a similar diagrammatic showing in which the welding transformer is being maintained conductive during a desired portion of the wave of the input voltage; and, Fig. 5 (A and B) are diagrammatic showings of the voltages appearing across the phase-shifting transformer.

Referring to Fig. 3. it is assumed that the line switches LS1 and LS2 are closed at the instant in which the voltage of line L1 is zero and is to start on a negative half cycle. The blocking voltage Eb is substantially zero and ready to go into a positive half cycle. As the value of the blocking voltage becomes more positive with respect to the cathode of the valve V3, current flows through the network 32 and a gradually increasing potential is set up across the resistor thereof and consequently in reverse arrangement across the capacitor of the network 32, as shown by the voltage waves Egb and Ec. As the value of the voltage Eb approaches maximum, the value of the voltage Ec across the capacitor approaches a maximum and the value of voltage Egb is at its maximum positive potential. As the value of the voltage Eb decreases, the capacitor of the network 32 causes a negative voltage to be applied to the grid of the valve V3 with respect to the cathode thereof and flow of grid current ceases. The capacitor of the network 32 then commences to discharge through its associated resistor as indicated by the line identified as "normal discharge rate" of the capacitor with the selected resistance-capacitance value. An RC value of .03 second has been found to be satisfactory. The value of the voltage Egb will be the vector sum of the voltage Eb and the voltage Ec so that the voltage Egb will become negative quite a bit ahead of the time that the voltage of the line L1 becomes positive with respect to the line L2, thereby completely blocking the valve V3 against firing.

As shown in Fig. 3, the grid bias voltage is approximately fifty degrees ahead of the line voltage El. Since the voltage across the capacitor Ec is substantially D. C., as the blocking voltage Eb starts again from its extreme negative value toward a positive value the grid bias voltage will begin to lag the blocking voltage and will not become of zero value until approximately thirty degrees after the voltage of the line L1 has become negative with respect to the voltage of the line L2. It may, therefore, be seen that the use of this network 32 completely blocks conduction through the valve V3 even though the grid bias voltage should shift slightly due to transient conditions which might occur in the phase-shifting circuit. Similar subsequent cycles act in a similar manner as is also shown in Fig. 3.

In Fig. 4 there is shown the relationship of the grid bias voltage Egb when the winding UB is energized and the valves V3 and V4 are firing. For purposes of illustration, it is assumed that the switch SW1 is closed sometime prior to the time that the line L1 becomes positive and the value of Eb becomes negative. At the instant A, the valve V1 will commence to conduct. Shortly thereafter, for example at the instant B, any transient which has been caused by the change of the circuit conditions will have subsided and a new steady state of the operation of the phase-shift circuit of the network 32 is established.

The voltage conditions will now be represented by the line El which represents the voltage of the line L1 with respect to the line L2, the voltage wave Eps which represents the resultant output voltage of the secondary winding of the transformer T2 associated with the valve V3 and voltage wave Egb which represents the voltage between the grid and cathode of the valve V3. Since to render the valve V3 conductive it is not necessary to apply any predetermined maximum value of positive bias to the grid thereof, the valve V3 being operable to be rendered conductive at a very slight negative or zero bias, it will be observed that the valve V3 will be fired at approximately one hundred ten degrees behind the voltage wave El and will be continued to be fired at a predetermined lagging relationship with respect to the voltage wave El throughout subsequent cycles during the time that the valves V1 and V2 are maintained conductive. The lagging relationship of the voltage Egb is somewhat greater than that of the phase-shift voltage Eps. However, this is not detrimental to the action of the system as it is necessary merely to recalibrate the adjustment of the resistor R4 to take into account this increased lagging effect due to the network 32.

In Fig. 2 there is shown a modified form of the network 2 comprising two transformers T10 and T12, a circuit closing switch SW2, and a variable reactor VR which may be either of the inductive type similar to the transformer T8 of Fig. 1 or may be of the capacitive type whereby a phase-shifted voltage may be applied to the primary winding of the transformer T10 with respect to the voltage applied to the primary winding of the transformer T12. The primary winding of the transformer T12 is directly connected between the lines L1 and L2 as shown by the reference characters applied thereto, while the primary winding of the transformer T2, also connected between the lines L1 and L2, is connected in series with the switch SW2 and the variable reactor VR. Closure of the switch SW2 directly connects the line L1 to the variable reactor VR and the primary of the transformer T10 whereby the transformer T10 is energized by the sine wave voltage applied to the lines L1 and L2. It is, therefore, unnecessary in this instance to apply the sine wave correcting capacitors C1, C2 and C4 as was necessary in the showing of Fig. 1.

Each of the transformers T10 and T12 has two secondary windings, corresponding ones of which are connected in series and their resultant voltages applied between the grid and cathode of the valves V3 and V4 respectively. If desired, the networks 32 and 34 may also be associated with these conductors; however, with the continually closed switch SW2, the occurrence of transients in the output windings of the transformers T10 and T12 is substantially reduced and its importance is therefore likewise reduced. The phase relationships of the series connected secondary windings of the transformers T10 and T12 with respect to the voltage of the lines L1 and L2 is such that the voltage obtained from the secondary windings of the transformer T12 lags the voltage between the lines L1 and L2 by substantially one hundred eighty degrees, while the voltage applied by the secondary windings of the transformer T10 lags the voltage of the lines L1 and L2 by a much lesser angle and which angle ranges from zero degrees to ninety degrees depending upon the amount of phase shift desired in the operation of the valves V3 and V4. The operation of this modified network is similar to that described with respect to the network 2 of Fig. 1, and it is believed that a further detailed description thereof is unnecessary.

What is claimed and is desired to be secured by United States Letters Patent is as follows:

1. In an electrical control system, an electronic valve having a pair of main electrodes and a control electrode, means including a transformer having a center tapped primary winding for applying a control voltage between one of said main electrodes and said control electrode, a first circuit means including one half of said winding associated with said applying means and providing a first voltage such that said control voltage maintains said valve non-conductive, a second circuit means including the other half of said winding associated with said applying means and providing a second voltage dephased with respect to said first voltage whereby the vector sum of the flux produced in said transformer by said first and said second voltages results in a transformer output control voltage which renders said valve capable of conducting, and means controlling the energization of said second circuit means.

2. In an electrical control system, an electronic valve having a pair of main electrodes and a control electrode, transformer means for applying a control voltage between one of said main electrodes and said control electrode, a first circuit means supplying said transformer means with a first voltage such that said applied voltage maintains said valve nonconductive, a second circuit means supplying said transformer means with a second voltage dephased with respect to said first voltage whereby when said first and said second voltages are both applied to said transformer means said applied voltage renders said valve capable of conducting, and means controlling the energization of said second circuit means.

3. In an electrical control system, an electronic valve having a pair of main electrodes and a control electrode, a phase-shifting network having input terminals and output terminals, said output terminals being electrically connected to one of said main electrodes and to said control electrode, said input terminals being connected to a voltage having a frequency and phase proportional to the frequency and phase of the voltage applied to said main electrodes, said network including a transformer for selectively controlling the phase shift of said network from a predetermined valve-conducting condition to a valve-blocked condition, and means including a variable resistor connected across the secondary winding of said transformer for adjusting the phase shift of said network whereby the output of said valve is controlled.

4. In an alternating voltage electrical control system, a translating means adapted to be energized for selective time intervals and for selected portions of the voltage cycle, a current-controlling valve having a pair of principal electrodes and a control electrode, a phase-shifting network having output terminals connected between one of said principal electrodes and said control electrode, said network comprising a first and a second impedance leg, said first leg including an impedance means for determining the phase of a voltage characteristic and of such value as to provide the phase of said characteristic such that with said second leg in one circuit-controlling condition the phase of the voltage applied between said one electrode and said control electrode maintains said valve nonconductive, said second leg including an impedance means for determining the phase of a second characteristic and of such value as to provide a phase of said second characteristic which is dephased with respect to said first leg characteristic the magnitude of the dephase of said second characteristic being sufficiently great so that when said second leg is in a second circuit-controlling condition the voltage applied by said terminals between said one electrode and said control electrode is such that said valve is rendered capable of conducting for said selected portion of said voltage cycle, and means operable to place said second leg in said one condition and in said second condition whereby said valve is rendered conductive for said selected time interval and rendered nonconductive at other time internals.

5. In an alternating voltage electrical control system, a translating means adapted to be energized for selective time intervals and for selected portions of the voltage cycle, a current controlling valve having a pair of principal electrodes and a control electrode, a phase-shifting network having output terminals connected between one of said principal electrodes and said control electrode, said network comprising a first and a second impedance leg, said first leg having a continually applied voltage characteristic such that with said second leg de-energized the phase of the voltage applied between said one electrode and said control electrode is such that said valve is maintained nonconductive, said second leg having a voltage characteristic dephased with respect to said first leg characteristic such that when said second leg is energized the voltage applied by said terminals between said one electrode and said control electrode is such that said valve is rendered capable of conducting for said selected portion of said voltage cycle, and means operable to energize and de-energize said second leg whereby said valve is rendered conductive for said selected time interval and rendered nonconductive at other time intervals.

6. In an alternating voltage electrical control system, a translating means adapted to be energized for selective time intervals and for selected portions of the voltage cycle, a current controlling valve having a pair of principal electrodes and a control electrode, a phase-shifting network having output terminals connected between one of said principal electrodes and said control electrode, said network comprising a first and a second impedance leg, said first leg having a continually applied voltage characteristic such that with said second leg de-energized the phase of the voltage applied between said one electrode and said control electrode is such that said valve is maintained nonconductive, said second leg having a voltage characteristic dephased with respect to said first leg characteristic such that when said second leg is energized the voltage applied by said terminals between said one electrode and said control electrode is such that said valve is rendered capable of conducting for said selected portion of said voltage cycle, and means including electronic valves operable to energize and de-energize said second leg whereby said current controlling valve is rendered conductive for said selected time interval and rendered nonconductive at other time intervals.

7. In an alternating voltage electrical control system, a current-controlling valve having a pair of principal electrodes and a control electrode, transformer means having an output winding connected to bias said control electrode relative to one of said principal electrodes, said transformer means having a pair of input windings, circuit means maintaining continual energization of one of said input windings whenever voltage is applied between said principal electrodes, circuit means for selectively energizing the other of said input windings, a phasing element for controlling the phase of the input voltage to said one input winding whereby the output voltage of said output winding provides a blocking bias on said control element when said second-named circuit means is de-energized, and a phasing element for controlling the phase of the voltage applied to said other winding so that upon energization of both of said input windings a bias is provided on said control element to provide for conduction of said valve during a selected portion of the voltage wave.

8. In an alternating voltage electrical control system, a current-controlling valve having a pair of principal electrodes and a control electrode, transformer means having an output winding connected to bias said control electrode relative to one of said principal electrodes, said transformer means having a pair of input windings, circuit means maintaining continual energization of one of said input windings whenever voltage is applied between said principal electrodes, circuit means for energizing the other of said input windings, a phasing element for controlling the phase of the input voltage to said one input winding whereby the output voltage of said output winding provides a blocking bias on said control element when said second-named circuit means is de-energized, a phasing element for controlling the phase of the voltage applied to said other winding so that upon energization of both of said input windings a bias is provided on said control element to provide for conduction of said valve during a selected portion of the voltage wave, and means controlling the energization of said last-named circuit means.

9. In an alternating voltage electrical control system, a phase-shifting network comprising transformer means having a plurality of windings, a first circuit means for one of said windings, and including an impedance element, a second circuit means for a second of said windings and including an impedance element, said impedance elements being so inter-related that the voltages in said circuit means are dephased with respect to each other, a pair of reversedly arranged electronic valves of the discontinuous control type controlling the energization of one of said circuit means, and reactance means associated with said one circuit means for rendering the current flow in the winding associated with said one circuit means substantially sinusoidal.

10. In an alternating voltage electrical control system, an electronic current controlling valve having a pair of principal electrodes and a control electrode, a phase-shifting network controlling the conductivity of said valve and comprising a transformer means having an output circuit connected between one of said principal electrodes and said control electrode, network means comprising a capacitor and a resistor arranged in parallel circuit with each other, said capacitor and resistor being so related in value with each other as to have an R-C time value of at least one and one-half cycles of the alternating voltage which is applied to the system, said network means being located in said output circuit adjacent said control electrode, a pair of input circuits for said transformer means, each of said input circuits including an impedance element, each said element having a different voltage-phasing relationship, means continually energizing one of said pair of input circuits, the one of said elements in said one input circuit being arranged to provide a control voltage for said control electrode such that whenever voltage is supplied to said principal electrodes and the other of said input circuits is de-energized said valve is maintained nonconductive, means comprising a pair of reversedly arranged discontinuous control-type valves controlling flow of current through the other of said pair of input circuits, the one of said elements in said other input circuit being arranged to provide an input voltage which when combined with that of said one input circuit will provide a control voltage for said control electrode such that said current-controlling valve is rendered conductive, means operable to render said reversedly arranged valves conductive, and impedance means associated with said transformer means for rendering the current flow through said transformer means due to conduction of said reversedly arranged valves substantially sinusoidal.

11. In an alternating voltage electrical control system adapted to control the energization of a translating means adapted to be energized for selective time intervals and for selected portions of the voltage cycle, a current controlling valve having a pair of principal electrodes and a control electrode, a phase-shifting network having output terminals connected between one of said principal electrodes and said control electrode, said network comprising a first and a second impedance leg, said first leg having a continually applied voltage characteristic such that with said second leg in one conducting condition the phase of the voltage applied between said one electrode and said control electrode is such that said valve is maintained nonconductive, said second leg having a voltage characteristic dephased with respect to said first leg characteristic such that when said second leg is in a second conducting condition the voltage applied by said terminals between said one electrode and said control electrode is such that said valve is rendered capable of conducting for said selected portion of said voltage cycle, and means operable to render said second leg in said one and said second condition whereby said valve is rendered conductive for said selected time interval and rendered nonconductive at other time intervals.

12. In an alternating voltage electrical control system, a current-controlling valve having a pair of principal electrodes and a control electrode, transformer means having an output winding connected to bias said control electrode relative to one of said principal electrodes, said transformer means having a pair of input windings, circuit means maintaining continual energization of one of said input windings whenever voltage is applied between said principal electrodes, circuit means for selectively energizing the other of said input windings, said first-named circuit means being phased to provide a blocking bias on said control element when said second-named circuit means is de-energized, and a phasing element for controlling the phase of the voltage applied to said other winding so that upon energization of both of said input windings a bias is provided on said control element to provide for conduction of said valve during a selected portion of the voltage wave.

13. In an alternating voltage electrical control system, a current-controlling valve having a pair of principal electrodes and a control electrode, transformer means having an output winding connected to bias said control electrode relative to one of said principal electrodes, said transformer means having a pair of input windings, circuit means for energization of one of said input windings, circuit means for selectively energizing the other of said input windings, said first-named circuit means being phased to provide a blocking bias on said control element when said second-named circuit means is de-energized, and a phasing element for controlling the phase of the voltage applied to said other winding so that upon energization of said other winding a bias is provided on said control element to provide for conduction of said valve during a selected portion of the voltage wave.

14. The combination of claim 13 in which said phasing element comprises a transformer having its primary winding connected in series with said other input winding and having its secondary winding connected across a resistor.

15. The combination of claim 14 in which said resistor may be adjusted to vary the magnitude of current circulating through said secondary winding.

CLETUS J. COLLOM.

REFERENCES CITED

The following references are of record in the file of this patent:

UNITED STATES PATENTS

| Number | Name | Date |
| --- | --- | --- |
| 1,892,543 | Troger | Dec. 27, 1932 |
| 1,954,680 | Morack | Apr. 10, 1934 |
| 2,020,314 | Howe | Nov. 12, 1935 |
| 2,030,100 | Dawson | Feb. 11, 1936 |
| 2,033,016 | Vedder | Mar. 3, 1936 |
| 2,359,181 | Willis | Sept. 26, 1944 |
| 2,395,881 | Klemperer | Mar. 5, 1946 |

Certificate of Correction

Patent No. 2,480,000 August 23, 1949

CLETUS J. COLLOM

It is hereby certified that errors appear in the printed specification of the above numbered patent requiring correction as follows:

Column 4, line 4, for the word "eight" read *eighty*; column 10, line 63, for "internals" read *intervals*;

and that the said Letters Patent should be read with these corrections therein that the same may conform to the record of the case in the Patent Office.

Signed and sealed this 17th day of January, A. D. 1950.

[SEAL]

THOMAS F. MURPHY,
*Assistant Commissioner of Patents.*